(12) United States Patent
Jiang et al.

(10) Patent No.: US 10,454,824 B2
(45) Date of Patent: Oct. 22, 2019

(54) GENERIC COMMUNICATION CHANNEL FOR INFORMATION EXCHANGE BETWEEN A HYPERVISOR AND A VIRTUAL MACHINE

(71) Applicant: Nicira, Inc., Palo Alto, CA (US)

(72) Inventors: Caixia Jiang, Beijing (CN); Jianjun Shen, Palo Alto, CA (US); Aditi Ghag, Palo Alto, CA (US); Danting Liu, Beijing (CN); Hongshun Chang, Beijing (CN); Donghai Han, Beijing (CN); Vladimir Cherepanov, San Jose, CA (US)

(73) Assignee: Nicira, Inc., Palo Alto, CA (US)

( * ) Notice: Subject to any disclaimer, the term of this patent is extended or adjusted under 35 U.S.C. 154(b) by 44 days.

(21) Appl. No.: 15/909,889

(22) Filed: Mar. 1, 2018

(65) Prior Publication Data

US 2019/0273683 A1    Sep. 5, 2019

(51) Int. Cl.
| | |
|---|---|
| *H04L 12/741* | (2013.01) |
| *H04L 29/12* | (2006.01) |
| *H04L 12/46* | (2006.01) |
| *G06F 9/455* | (2018.01) |
| *H04L 12/931* | (2013.01) |

(52) U.S. Cl.
CPC ........ *H04L 45/745* (2013.01); *G06F 9/45558* (2013.01); *H04L 12/4645* (2013.01); *H04L 49/70* (2013.01); *H04L 61/2007* (2013.01); *G06F 2009/45595* (2013.01); *H04L 61/6022* (2013.01)

(58) Field of Classification Search
CPC ... H04L 45/745; H04L 49/70; H04L 12/4645; H04L 61/2007; H04L 61/6022; G06F 9/45558; G06F 2009/45595
See application file for complete search history.

(56) References Cited

U.S. PATENT DOCUMENTS

| | | | |
|---|---|---|---|
| 8,958,298 B2 * | 2/2015 | Zhang | H04L 47/12 370/235 |
| 2019/0163636 A1 * | 5/2019 | Yang | G06F 12/0848 |

* cited by examiner

*Primary Examiner* — Walter J Divito
(74) *Attorney, Agent, or Firm* — Patterson + Sheridan, LLP (57) ABSTRACT

Certain embodiments described herein are generally directed to configuring a generic channel for exchanging information between a hypervisor and a virtual machine run by the hypervisor that resides on a host machine. In some embodiments, the generic channel represents a network or communication path enabled by a logical switch that connects a HyperBus running on the hypervisor and a node agent running on the virtual machine. In some embodiments, network traffic handled by the generic channel is isolated from incoming and outgoing network traffic between the virtual machine and one or more other virtual machines or hosts.

21 Claims, 7 Drawing Sheets

GENERIC COMMUNICATION CHANNEL FOR INFORMATION EXCHANGE BETWEEN A HYPERVISOR AND A VIRTUAL MACHINE

BACKGROUND

Software defined networking (SDN) comprises a plurality of hosts in communication over a physical network infrastructure, each host having one or more virtualized endpoints such as virtual machines (VMs) or containers that are connected to logical overlay networks that may span multiple hosts and are decoupled from the underlying physical network infrastructure. One common characteristic of software defined networking is a separation of the control plane from the data plane. The control plane is concerned with determining the logical overlay network topology and maintaining information about network entities such as logical switches, logical routers, and endpoints, etc. The logical topology information is translated by the control plane into network configuration data that is then communicated to network elements of each host. The network configuration data, for example, includes forwarding table entries to populate forwarding tables at virtual switche(s) provided by the hypervisor (i.e., virtualization software) deployed on each host. In some cases, the control plane may need to transmit the network configuration data, or other types of data, to one or more VMs running on the virtualization software of a host.

An example of this is when SDN is integrated with solutions such as platform as a service (PAAS) and container as a service (CAAS) to provide native network support to containers that are created within various virtual machines on a hypervisor. Platform as a service (PAAS) and container as a service (CAAS) solutions like Cloud Foundry, Kubernetes, and Openshift provide application level abstractions that allow developers to deploy, manage, and scale their applications. PAAS is a service that provides a platform that allows users to develop, run, and manage applications without the complexity of building and maintaining the infrastructure typically associated with launching an application. For example, a user can control software deployment with minimal configuration options, while the PAAS provides services to host the user's application. CAAS is a form of container-based virtualization in which container engines, orchestration, and the underlying compute resources are delivered to users as a service from a cloud provider. These solutions provide support for compute and storage but do not provide any native networking support. As such, SDN is utilized to provide networking for the containers. For example, after a new container is scheduled for creation, the SDN control plane generates network interface configuration data that can be used by the container host VM (i.e., the VM hosting the container) to configure a network interface for the container. The configured network interface for the container enables network communication between the container and other network entities, including containers hosted by other VMs on the same or different hosts. In order for the host VM to set up a network interface for a new container, the host VM may require access to the network interface configuration data generated for the container by the SDN control plane. In some cases, some PaaS and CaaS solutions may provide a mechanism to send the network interface configuration data to the host VM. However, other PaaS and CaaS solutions may not provide such a mechanism.

SUMMARY

Herein described are one or more embodiments of a method for exchanging information between a hypervisor and a virtual machine run by the hypervisor that resides on a host machine. The method includes receiving, at a first daemon running on the hypervisor, information from a network control plane, wherein the information is destined for a second daemon running inside the virtual machine. The method also includes generating, at the first daemon, a packet having a payload including at least a portion of the information and a header including a source internet protocol (IP) address of the first daemon, a source media access control (MAC) address of the first daemon, a first destination IP address associated with the second daemon, and a destination MAC address of the second daemon. The method includes storing a first identifier in metadata associated with the packet. The method also includes receiving, at a first port of a first virtual switch implemented by the hypervisor, the packet from the first daemon, the first daemon being coupled to the first port. The method further includes determining, at the first virtual switch, to forward the packet to a second port of the first virtual switch based on the first identifier, the destination MAC address, and the first destination IP address, wherein the second port is configured to pass packets associated with the first identifier. The method also includes tagging, at the first virtual switch, the packet with a second identifier based on a mapping of the first identifier to the second identifier. The method also includes transmitting the packet, at the second port of the first virtual switch, to a virtual network interface card (VNIC) of the virtual machine, wherein the VNIC is coupled to the second port. The method also includes passing, at the VNIC, the packet to a second virtual switch implemented by the virtual machine. The method additionally includes determining, at the second virtual switch, to forward the packet to a port on the second virtual switch based on the second identifier, the destination MAC address, and a second destination IP address, wherein the port is configured to pass packets associated with the second identifier, wherein the second daemon is coupled to the port. The method also includes receiving the packet at the second daemon over the port.

Also described herein are embodiments of a computer system, wherein a program executable in a processor performs operations to execute the method described above for exchanging information between a hypervisor and a virtual machine run by the hypervisor that resides on a host machine.

Also described herein are embodiments of a non-transitory computer-readable storage medium containing a program which, when executed by one or more processors, performs operations for exchanging information between a hypervisor and a virtual machine run by the hypervisor that resides on a host machine.

DETAILED DESCRIPTION

Embodiments presented herein provide a generic channel configured between a hypervisor and a virtual machine for secure information exchange between the hypervisor and the virtual machine. In certain embodiments, the generic channel is used to communicate network interface configuration data generated for an application, such as a container, that is deployed on a VM running on a hypervisor. As an example, a user can deploy the container within a VM using a PAAS or CAAS platform (e.g., using an orchestrator as a tool to deploy the container). In order for the container to communicate with other containers or network entities, the container may be set-up with a network interface using network interface configuration data that is generated by a SDN central controller for the container. Accordingly, as described herein in relation to FIG. 3, the generic channel is used by the hypervisor to communicate the network interface configuration data generated by the SDN central controller to the VM hosting the container. The use of the generic channel by a hypervisor to communicate a container's network configuration data to a VM that is hosting the container is merely an example use case of the generic channel. The generic channel may be used by the hypervisor and a VM, or another entity such as another type of virtualized computing instance, running "on top of" the hypervisor for communicating any sort of information.

Figure 1:
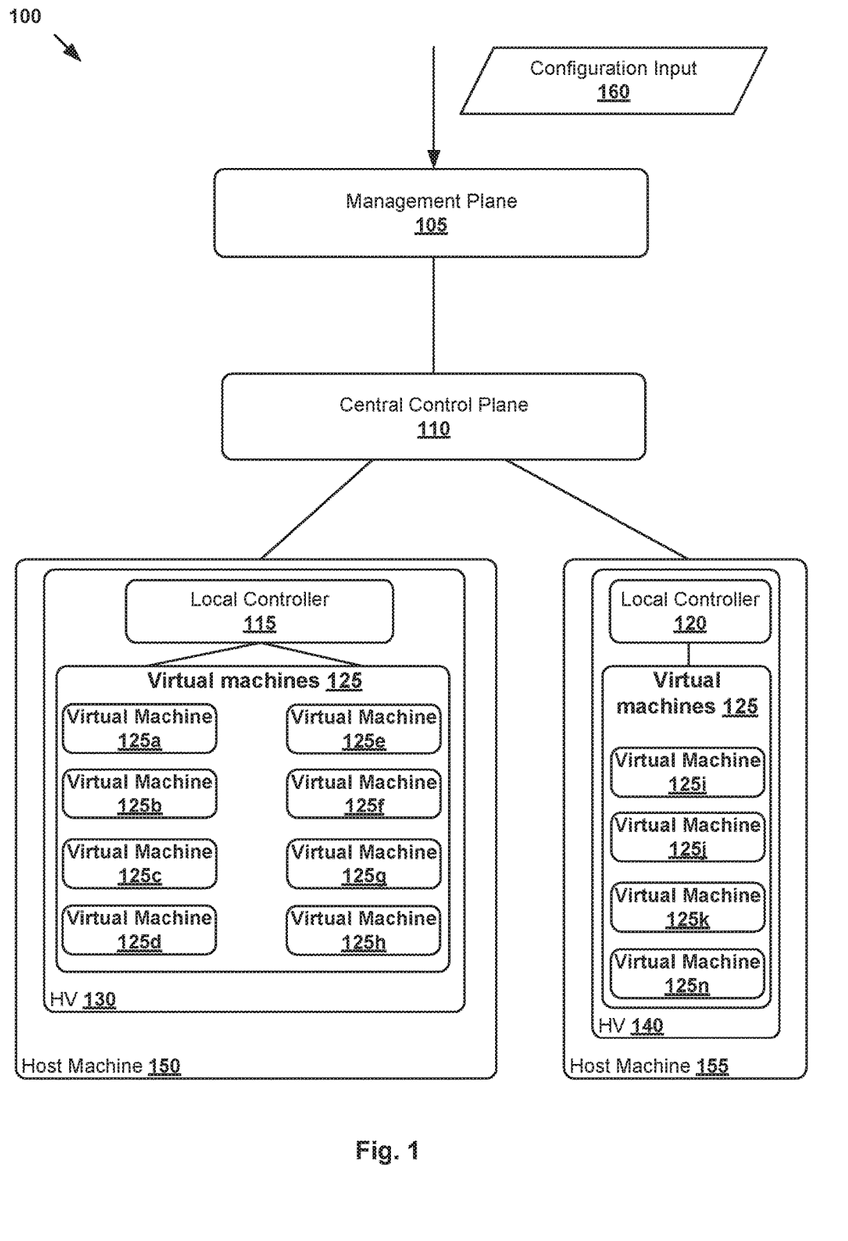
FIG. 1 is a block diagram of a network control system for a virtual network.

FIG. 1 is a block diagram of a network control system 100 including a central control plane 110 that implements software defined networking (SDN) in embodiments described herein. As shown, network control system 100 includes a management plane 105, a central control plane 110, and multiple local controllers (also called the local control plane (LCP)) 115 and 120 that operate on host machines 150-155, which are physical computing devices that support the execution of virtual machines (VMs) or other virtualized computing instances, such as namespace containers. In addition, each of host machines 150-155 runs a hypervisor 130-140, respectively, capable of creating and managing a plurality of virtual machines 125a-125n on host machines 150-155. Each of virtual machines 125a-125n are examples of endpoints. Though virtual machines are shown as endpoints in FIG. 1, other types of endpoints, such as containers, are used in some embodiments. Embodiments described in further detail below use containers as example endpoints.

Figure 2:
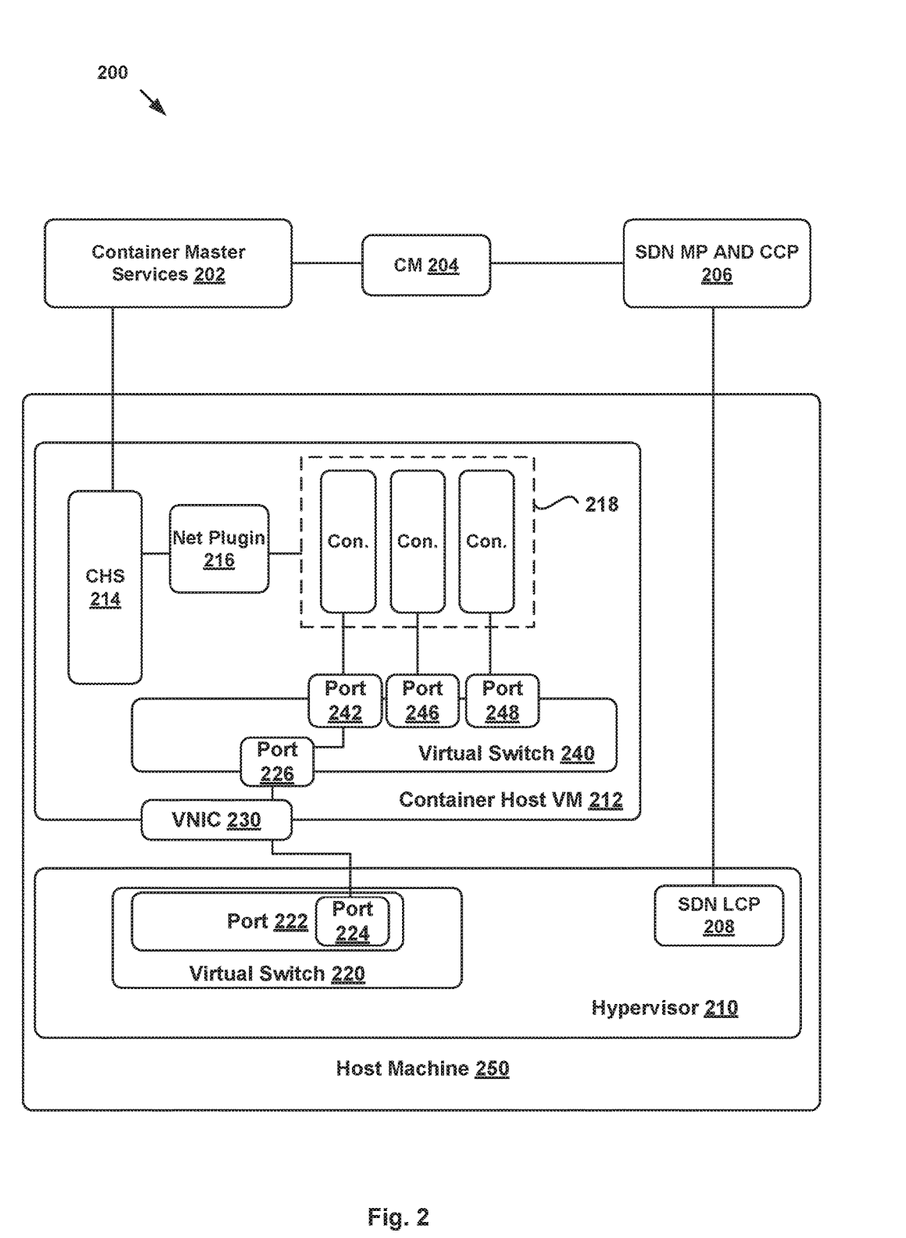
FIG. 2 is a block diagram of an architecture for implementing embodiments described herein.
Figure 3:
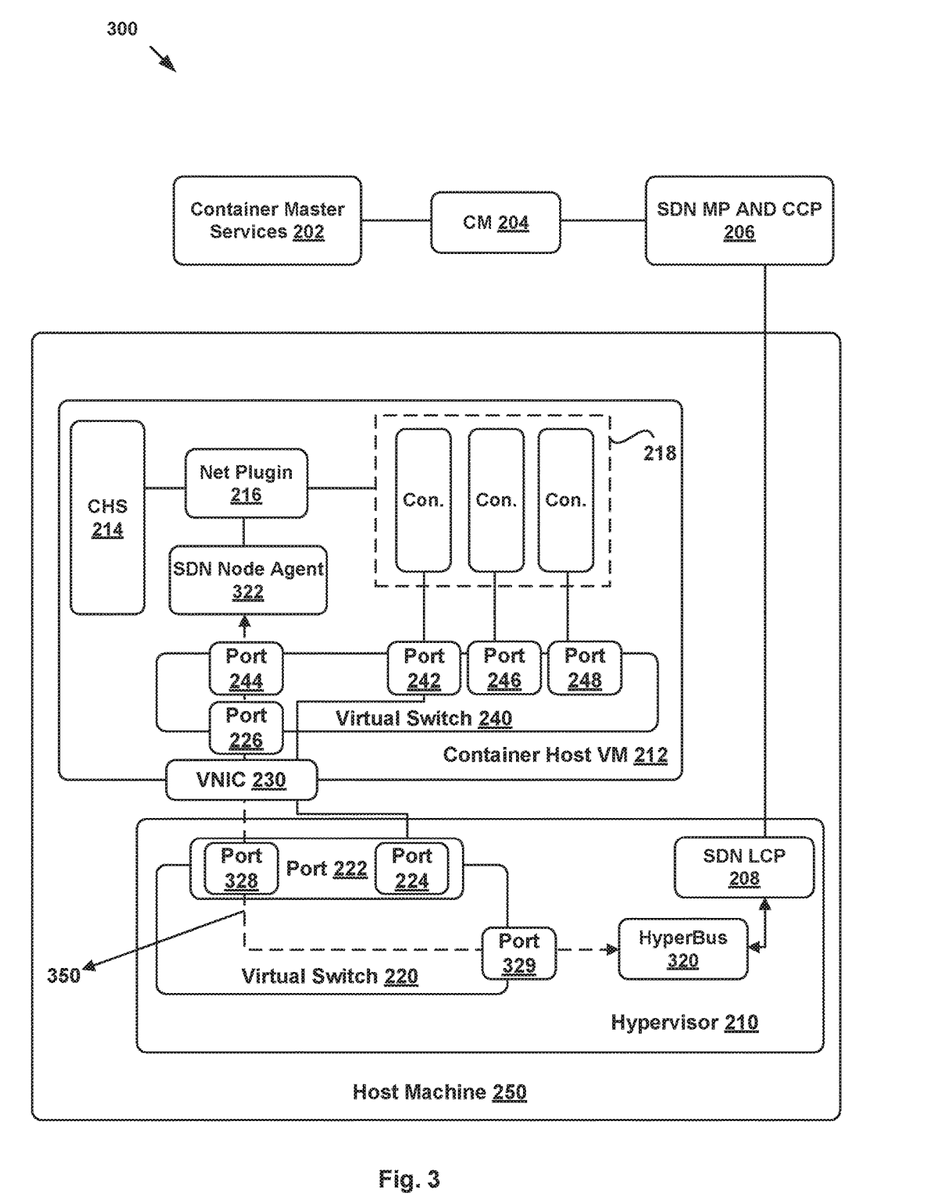
FIG. 3 illustrates a generic channel established between a hypervisor and a virtual machine, according to one example embodiment.

Hypervisors 130-140 and virtual machines 125a-125n, for example, are stored in a memory (not shown) of host machines 150-155. Hypervisors 130-140 abstract processor, memory, storage, and/or networking resources (not shown) of host machines 150-155 into multiple virtual machines (e.g., VMs 125a-125n) that can run side-by-side on the same host machines 150-155. That is, the virtualization software partitions physical host machines 150-155 into multiple secure and portable virtual machines. Each virtual machine may represent a complete virtual system—with virtual processors, virtual memory, virtual networking interface, virtual disk storage, and its own BIOS. For example, as shown in FIGS. 2 and 3, each virtual machine (e.g., container host VM) comprises a software-based virtual network adaptor, also referred to as a virtual network interface card (VNIC), shown in FIGS. 2 and 3 as VNIC 230, that is logically connected to instantiations of the control plane (e.g., local controllers 115-120) running on host machines 150-155 and provides network access for the virtual machine. Each VM's VNIC is typically connected to the local controllers 115-120 through a virtual switch that may serve as a physical network switch, i.e., serve as an edge device on the physical network, but implemented in software. As described below, this virtual switch may be implemented by the underlying hypervisor (e.g., shown in FIGS. 2 and 3 as virtual switch 220) that processes and forwards packets being exchanged between the VMs' VNICs and the local controllers 115-120.

Each VM may also implement a virtual switch (e.g., shown in FIGS. 2 and 3 as virtual switch 240) for forwarding ingress packets to various entities running within the VM (e.g., containers). A virtual switch running within a VM may be configured with internally-maintained forwarding tables that are populated by central control plane 110 (FIG. 1) for determining how to process and forward ingress packets.

As described above, hypervisors 130-140 may implement virtual switches, and the like (e.g., virtual routers). For example, as shown in FIGS. 2 and 3, hypervisor 210 implements virtual switch 220 that is configured with internally-maintained forwarding tables that are populated by central control plane 110 for determining how to process and forward ingress packets. The hypervisor's virtual switch may have a number of virtual ports, each of which may be responsible for forwarding packets to a different VM. For example, as further described below, each virtual port is connected to a respective VM's VNIC and is configured to forward traffic that is destined for the VM to the VM's VNIC. In some embodiments, each virtual port that connects to a certain VM, as described below, contains one or more sub-ports, each of which may be configured for forwarding traffic to entities running within the VM (e.g., containers). In some embodiments where KVM provides the functionality of hypervisor 210, KVM uses OpenFlow flows to distribute containers' traffic instead of sub-ports. The OpenFlow switch protocol provides an open interface for controlling connectivity and flows within a SDN environment.

The hypervisor architecture may vary. In some embodiments, a virtualization software can be installed as system level software directly on the server hardware (often referred to as "bare metal" installation) and be conceptually interposed between the physical hardware and the guest operating systems executing in the virtual machines. Alternatively, the virtualization software may conceptually run "on top of" a conventional host operating system in the server. In some implementations, the hypervisor may comprise system level software as well as a "Domain 0" or "Root Partition" virtual machine, which is a privileged machine that has access to the physical hardware resources of the host. In this implementation, the virtual switch, along with hardware drivers, may reside in the privileged virtual machine.

Though shown as single entities, it should be understood that both management plane 105 and central control plane 110 may be implemented as a distributed or clustered systems. For example, management plane 105 may include multiple computing devices that implement management plane functions, and a central control plane 110 may include multiple central (or distributed) controller computers, virtual machines, containers, or processes that implement central control plane functions. In some embodiments, one or more centralized controllers include both management plane and central control plane functions (e.g., as separate applications or functions).

In some embodiments, management plane 105 (FIG. 1) is responsible for receiving logical network configuration inputs 160. As described in further detail below, in some embodiments, logical network configuration inputs 160 may be received from a container orchestrator over a network via an application programming interface. Users (e.g., network administrators) may also or instead input logical network configuration data through a user interface such as a command-line interface or graphical user interface. Each logical network configuration for each logical network, in some embodiments, may include data defining one or more endpoints (e.g., virtual machines 125a-125n or containers) and the connections between the endpoints.

Management plane 105 further generates desired state data that specifies how the logical network should be implemented in the physical infrastructure based on logical network configuration input 160. In some embodiments, this data includes description of the logical forwarding elements (e.g., logical switches, logical routers, etc.) and logical ports in a uniform format (e.g., as a set of database records or another format). The central control plane 110 then updates/implements the logical network based on the desired state information. For example, the central control plane 110 is responsible for managing and maintaining information about virtual machines, virtual switches, virtual routers, etc. implemented on host machines. In certain embodiments, central control plane 110 is responsible for configuring physical network elements implemented by host machines 150, 155, including virtual switches (see FIGS. 2-3) packet filters (not shown) and tunnel endpoints (not shown) to ensure that the defined logical network topologies and policies are properly implemented.

In the embodiments described herein, the management plane 105 translates an application level configuration (received from a container orchestrator) to logical network topologies that define the application networking on the SDN.

FIG. 2 illustrates an architecture 200 that allows users to deploy containers within container host VM 212 using container orchestrators. Container orchestrators, or container orchestration tools, are used to manage containers across an infrastructure. That is, container orchestrators allow a user to deploy, scale, upgrade, remove, or otherwise manage containers. These tools simplify container management and provide a framework for defining initial container deployment plus the ability to manage multiple containers. Example container orchestrators include orchestrators from Kubernetes®, OpenShift®, Docker Swarm®, Cloud Foundry®, and Mesos®.

Container master services 202 is a component of a container orchestrator that is used in the embodiments of FIG. 2, and performs central management functions for the container orchestrator. Container master services 202 can run on a server of the PaaS/CaaS. Architecture 200 also includes container host services 214, which is a host-level agent that communicates with container master services 202 and manages the lifecycle of the containers. Container host services 214 is an agent that runs on each container host VM 212.

A user can deploy containers within container host VM 212 through a container orchestrator as discussed above. For example, container master services 202 may receive a user's request for creating a container as well as configuration details of the container, which may collectively be referred to as event requests herein. Having received the event requests, container master services 202 then chooses a host VM, such as host VM 212, and communicates with container host services 214 to create the container. Container host services 214 then creates the container.

As described above, container master services 202 may provide support for compute and storage but it does not provide any native networking support. Accordingly, as shown in FIG. 2, architecture 200 enables the integration of SDN for network connectivity and security. The SDN components of architecture 200 include SDN container manager (CM) 204, SDN management plane (MP) and central control planes (CCP) 206, SDN LCP 208, and net plugin 216. CM 204 is an SDN plugin that serves as a bridge between a PAAS/CAAS platform (i.e., container master services 202) and SDN MP and CCP 206. In some embodiments, CM 204 refers to a collection of container orchestrator adapters, a container orchestrator API, a CM controller, and SDN APIs (not separately shown). CM 204 uses container orchestrator adaptors (e.g., Kubernetes® adaptor) so that container orchestrators of different types can implement the interface exposed to interact with SDN. The container orchestrators interact with CM 204 through these adaptors. For example, CM 204's adaptors may receive information from container master services 202 and, subsequently, use the container orchestrator API to invoke the CM controller that performs the responsibilities and functions of CM 204 discussed herein. In some embodiments, CM 204's CM controller, in turn, invokes SDN MP and CCP 206 through the SDN API.

CM 204 performs feature translation from the event requests to logical network topologies based on rules configured by a user. More specifically, CM 204 monitors the container orchestrators (via container master services 202) to detect the addition and/or modification of new resources. When a user requests or schedules the creation of a container, CM 204 receives the corresponding event requests from container master services 202 and makes calls, using the SDN API, to translate features from container orchestrator abstractions to SDN logical resources (i.e., create the required network topology). For example, after receiving event requests relating to the creation of a new container, CM 204 also generates and allocates a container interface (CIF) identifier (i.e., CIF ID) and a virtual local area network (VLAN) ID to the container. CM 204 also calls an SDN API to create a logical switch port for the container.

This logical switch port may, for example, be later mapped to a virtual switch sub-port on virtual switch 220 of hypervisor 210. As described above, in some embodiments, virtual switch 220 comprises a number of virtual ports, each configured to communicate traffic. For example, virtual switch 220 may receive traffic with a destination of container host VM 212 over a virtual port (not shown), process the traffic, and push the traffic out from port 224 that is attached to VNIC 230 of container host VM 212. However, as described above, in some embodiments, port 222 of virtual switch 220 contains sub-ports, each of which is configured to handle traffic that is destined for a particular entity (e.g., container) running within container host VM 212. In such embodiments, the logical switch port that is created by CM 204 is mapped to sub-port 224, of port 222 to handle data traffic specifically for the new container.

Having created the logical switch port, CM controller 204 then calls the SDN API of SDN MP and CCP 206 to generate an internet protocol (IP) address and a media access control (MAC) address for the container. As described below, having an IP and a MAC address allows the new container to send and receive traffic in the network, provided that the new container is set-up with a container network interface that is configured with the IP/MAC address.

As described above, CM 204 makes a call to the API of the SDN MP and CCP 206 for an IP and MAC address to be generated and allocated to the container. The API call is received by management plane 105 (FIG. 1) which comprises plugins or adaptors that communicate with any given container orchestrator over a network. Based on the information received from the container orchestrator (i.e., the event requests), management plane 105 creates or modifies a logical network topology to connect the container to a logical overlay network. The logical overlay network is a software-defined network that may connect the container to other endpoints such as other containers on the same or different container host VMs on the same host or on different container host VMs on different hosts. Additionally, MP 105 may define service configurations for the overlay network such as security, multi-tenancy, traffic isolation, etc. In some embodiments, CM 204 may be part of the management plane 105 and run on one or more computing devices that implement the management plane 105. For example, CM 204 may be implemented as a plugin for MP 105 or otherwise integrated or operate in conjunction with MP 105. Accordingly, CM 204 may also be in communication with container orchestrators, including container master services 202, over a network.

Continuing with the example above, upon receiving the call from CM 204, management plane 105 creates a logical switch for the container's logical switch port (LSP), or creates the LSP on an existing logical switch, as well as an IP and a MAC address for the container. The logical switch is, for example, an abstraction of a network switch having logical switch ports that logically connects virtual entities. As described below, SDN MP and CCP 206 and SDN LCP 208 implement a logical switch port for a new container by configuring virtual switch 220 to receive traffic addressed to the new container from a port and push out the new container's traffic to VNIC 230 using sub-port 224. Thus, the logical switch port is mapped to a virtual switch port of virtual switch 220. The logical switch may stretch across multiple hosts so that multiple host VMs and multiple containers, or other endpoints such as a VM endpoint or gateway, at any arbitrary location in a datacenter, may be connected to the single logical switch. Communication for the logical network overlay between virtual switches on different hosts is implemented by a network of tunnels (not shown) between the participating hosts, all orchestrated by the SDN management and central control planes.

Having created the logical switch, management plane 105 pushes information including the container's IP and MAC address, VLAN ID, a container identifier (e.g., container ID, CIF ID, etc.), information about the LSP, and other necessary information to the central control plane 110. Central control plane 110 then generates network configuration information for implementing the logical switch for the new container and transmits the network configuration information, including information about the LSP, the container's IP and MAC address, the VLAN ID, and the container identifier, to SDN LCP 208. SDN LCP 208 (illustrated as local controllers 115-120 in FIG. 1) is an agent executing as part of hypervisor 210 that implements the network configuration received from SDN MP and CCP 206 in the hypervisor 210. After receiving the network configuration information including the LSP, the container's IP and MAC address, the VLAN ID, and the container identifier, SDN LCP 208 configures virtual switch 220 of hypervisor 210 to forward traffic for the new container. For example, as described above, SDN LCP 208 configures virtual switch 220 to receive the new container's traffic from a port, examine the packets (i.e., using forwarding tables configured by SDN LCP 208) to determine whether they include the new container's IP/MAC address and, upon making that determination, forward the packets to port 224 to be pushed to VNIC 230.

As described above, in order for the packets to be forwarded to and received by the new container after they arrive at VNIC 230, the new container needs to be set-up with a network interface, without which the new container is unable to exchange packets with the network. Accordingly, after the container is created, container host services 214 directs net plugin 216 to set up networking for the newly created container enabling the new container to send and receive traffic. Container host services 214 passes arguments to net plugin 216 by setting up environment variables. These environment variables may include container ID, container network namespace, container name, and container network interface name. The net plugin 216 runs on container host VM 212 and manages the containers' network interfaces during the containers' lifecycle. For example, each container may have a container network interface, which may be a software-based virtual network adapter as described herein. In order to configure the container with a container network interface, net plugin 216 needs to receive the container's IP and MAC address as well as the VLAN ID.

In some cases, after creating the container's IP and MAC addresses, management plane 105 returns the container's IP and MAC address to CM 204. CM 204 then calls an API for container master services 202 and utilizes the container orchestrator as a proxy to relay the VLAN ID, IP/MAC address of the new container, and the container identifier, to net plugin 216. Net plugin 216 uses this information to configure the container network interface for the container and program the container with the correct VLAN ID. Net plugin 216 also configures virtual switch 240 running in container host VM 212 to identify and forward traffic destined for the new container. This allows virtual switch 240 to forward the new container's traffic to the new container based on the new container's VLAN ID and IP/MAC address. At this point, the container is set up for connectivity. Accordingly, for example, after receiving the new container's traffic from VNIC 230, virtual switch 240 processes the packets and forwards them (e.g., based on the VLAN ID and the container's IP/MAC address in the packets' header) to the new container by pushing them out from port 242 that is configured for and attached to the new container. As shown, other ports, such as ports 246 and 248, are each configured for and attached to different, existing containers.

Although, as described above, in some cases a container orchestrator may be used by CM 204 to relay the VLAN ID as well as the IP/MAC address of the new container to net plugin 216, some container orchestrators may not provide such a mechanism. For example, as described above, a Kubernetes container orchestrator may provide a mechanism to receive the container network interface information (VLAN ID as well as the IP and MAC address of the new container) and share it with net plugin 216 to set-up a container network interface for the new container. However, another type of container orchestrator, such as Cloud Foundry, may not provide such a mechanism. Certain embodiments described herein provide a generic channel for communication between a hypervisor (e.g., hypervisor 210) and a VM (e.g., container host VM 212) running "on top of" the hypervisor. The generic channel configured between the hypervisor and the VM may be used for exchanging any sort of information between the two. As described in further detail below, an example use of this channel involves hypervisor 210 receiving the container network interface information from SDN MP and CCP 206 (i.e., through SDN LCP 208) and transmitting the information to net plugin 216, through the generic channel, to set-up the container's network interface information.

FIG. 3 illustrates example generic channel 350 configured between hypervisor 210 and container host VM 212. As described above, generic channel 350 provides a communication channel for hypervisor 210 to communicate with container host VM 212. Generic channel 350 is a cross platform (i.e., platform independent) communication channel that can be used in conjunction with software virtualization platforms such as the Kernel-based Virtual Machine (KVM), ESXi, and others.

As shown in FIG. 3, generic channel 350 is configured between HyperBus 320 and SDN node agent 322. HyperBus 320 is a daemon running on hypervisor 210 that is able to communicate both with SDN LCP 208 and SDN node agent 322. Through generic channel 359, HyperBus 320 is able to receive information from the SDN MP and CCP 206 (i.e., through SDN LCP 208) and communicate the information to SDN node agent 322. HyperBus 320 is configured to run on some or all hypervisors (e.g., hypervisor 210) in a network including. SDN node agent 322 is a daemon running inside container host VM 212 that is able to communicate with HyperBus 320 through generic channel 350. SDN node agent 322 is also configured on some or all container host VMs in the network.

In order for HyperBus 320 and SDN node agent 322 to communicate using generic channel 350, in some embodiments, they each use a network interface. For example, in some embodiments, HyperBus 320 uses the virtual IP address (VIP) and virtual MAC address (VMAC) associated with hypervisor 210's virtual network interface (i.e., the VM kernel NIC (VMKNIC)) for communicating. Similarly, in some embodiments, SDN node agent 322 has a network interface and uses an IP address and a MAC address for communicating that is associated with the network interface. In some embodiments, SDN node agent 322 is configured to use the MAC address of the underlying container host VM 212, meaning the MAC address associated with VNIC 230 of container host VM 212. For example, in the embodiments of FIG. 3, SDN node agent 322 uses the MAC address of container host VM 212. Further, SDN node agent 322 is configured with an IP address (e.g., a fixed IP address). In some embodiments, the IP address of all SDN node agents 322 are set to the same IP address, which may simplify the configuration of the SDN node agent 322. In order to differentiate between traffic for different SDN node agents 322, network address translation (NAT) may be used, as further discussed herein. In contrast, in some embodiments, each container host VM has a different MAC address, in which case each SDN node agent 322, therefore, has a MAC address that is different from MAC addresses of other SDN node agents.

In some embodiments, generic channel 350 represents a network or communication path enabled by a logical switch that connects HyperBus 320 and SDN node agent 322. In some embodiments, the functionality of this inner logical switch is implemented by configuring virtual switch 220 to allocate two new ports (i.e., distinct from the ports used for handling container data (e.g., ports 224)) including a port (e.g., port 329) for exchanging packets with HyperBus 320 and a port (e.g., sub-port 328) for exchanging packets with container host VM 212. Port 329 is a port that connects the VMKNIC to virtual switch 220. As described above, VMKNIC is the network interface that is used by HyperBus 320 to send and receive packets. The VMKNIC is configured on a TCP/IP stack that is different than the TCP/IP stack that handles networking for other types of traffic, including container traffic. In some embodiments, when sub-port 328 is configured to pass traffic originated from HyperBus 320 to a VNIC of a host VM (i.e., to be received by a corresponding SDN node agent), the sub-port may be tagged with a virtual extensible LAN identification (VXLAN ID). As further described below, this enables virtual switch 220 to examine a packet's VXLAN ID (e.g., stored in metadata associated with the packets) and destination IP/MAC addresses to find a matching sub-port and forward the traffic to the sub-port. For example, virtual switch 220 may be configured with forwarding tables that map a number of tuples (e.g., VXLAN ID, destination MAC address, destination IP address) to particular ports or sub-ports. In embodiments where KVM provides the functionality of hypervisor 210 in the kernel of Linux, a new interface is created in a separate namespace for HyperBus 320 to setup generic channel 350.

In some embodiments, to configure virtual switch 220, as described above, HyperBus 320, SDN LCP 208, and SDN node agent 322 exchange information among each other as follows. SDN LCP 208 sends HyperBus 320 each container host VM's virtual network interface configurations. For example, as described above, each container host VM, such as container host VM 212, has a VNIC and has been assigned an IP and MAC address. SDN LCP 208 sends HyperBus 320 the IP/MAC address of each container host VM as well as the gateway IP of the default gateway for each container host VM.

As discussed above, in some embodiments, the IP address of all SDN node agents 322 may be the same. As a result, in order for HyperBus 320 to be able to initiate a separate connection to each SDN node agent running on separate container host VMs, HyperBus 320 allocates a unique logical IP address (LIP) for each SDN node agent 322. In particular, a unique LIP is allocated by HyperBus 320 for each container host VM (e.g., for each VNIC of each container host VM) that is associated with a corresponding SDN node agent 322. A SDN node agent 322's LIP is then used by HyperBus 320 when sending traffic through generic channel 350 to the SDN node agent 322. In some other embodiments, each SDN node agent 322 may have a unique IP address. In such embodiments, HyperBus 320 may use each SDN node agent 332's unique IP address when transmitting packets to the corresponding SDN node agent 322.

In some embodiments, HyperBus 320 also receives network interface configuration information of a container (e.g., a new container) from SDN LCP 208. As described further in relation to FIG. 4, the network interface configuration information is then sent through generic channel 350 to SDN node agent 322 and is ultimately used by net plugin 216 to configure the corresponding container's network interface.

In some embodiments, for SDN LCP 208 to configure virtual switch 220, HyperBus 320 sends configuration information to SDN LCP 208. This configuration information includes HyperBus 320's global configuration such as HyperBus 320's network interface's IP address (i.e., VIP) as well as the IP address for the SDN node agents 322 (e.g., the fixed IP addresses). In addition, HyperBus 320 sends SDN LCP 208 a mapping of the LIP addresses to SDN node agents 322 (e.g., to the VNICs of the container host VMs of the SDN node agents 322). This enables SDN LCP 208 to set this configuration information to hypervisor 210's data plane (DP). As a result, the virtual switch 220 is configured to forward traffic that is associated with a certain LIP to the right VNIC of the right container host VM, and accordingly the right SDN node agent 322 on the container host VM. The mapping also enables virtual switch 220 to be configured to perform address translation at the ports (e.g., port 222 and its sub-ports), as described in further detail below. For virtual switch 220 to be configured, as discussed above, hypervisor 210 adds and provides DP support. The DP support also enables generic channel 350 to transmit packets. As described further below, additional steps may be taken to finalize the configuration of generic channel 350. For example, Version Exchange messages, Session Exchange messages, Subscription messages, and Keep Alive messages may be exchanged between HyperBus 320 and SDN node agent 322 to assure that generic channel 350 is fully configured and ready to be used. However, prior to a description of these additional configuration steps, the operation of generic channel 350 and how it is used by HyperBus 320 and SDN node agent 322 for information exchange will be described, with reference to FIG. 4.

Figure 4:
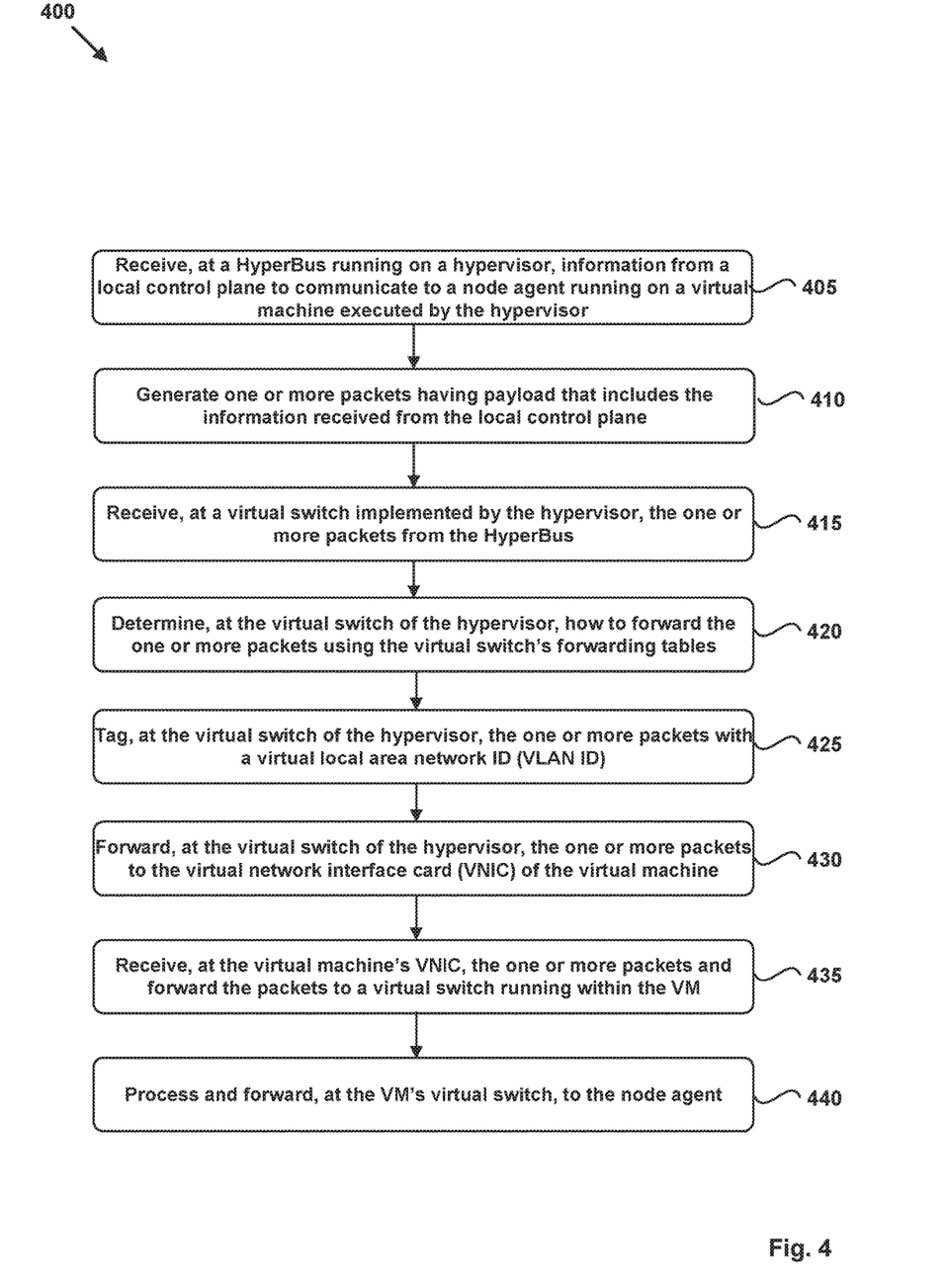
FIG. 4 illustrates example method steps performed by the hypervisor and the virtual machine of FIG. 3 for exchanging information using the generic channel, according to certain embodiments described herein.

FIG. 4 is a flow diagram of example method steps 400 relating to the use of a generic channel (e.g., generic channel 350) by a hypervisor for exchanging information with a VM running on the hypervisor. Method steps 400 are described with reference to FIGS. 1-3, and FIG. 5.

At 405, HyperBus 320 receives information from SDN LCP 208 to communicate to SDN node agent 322. As described above, a generic channel, such as generic channel 350 established between hypervisor 210 and container host VM 212 may be used for communicating various types of information. Accordingly, in some embodiments, a generic channel established between HyperBus 320 and SDN node agent 322 is used for information exchange in implementations that do not include the deployment of containers or involve any container-related components. However, as described in relation to FIG. 3, in some embodiments, generic channel 350 is used by HyperBus 320 to send network interface configuration information of a container (e.g., new container) to SDN node agent 322. In such embodiments, HyperBus 320 receives the container's network interface configuration information (e.g., the container's IP/MAC address and VLAN ID) from SDN LCP 208. As described above, the container's IP/MAC address are generated by management plane 105 and sent to SDN LCP 208 along with the VLAN ID as well as the container identifier.

Figure 5:
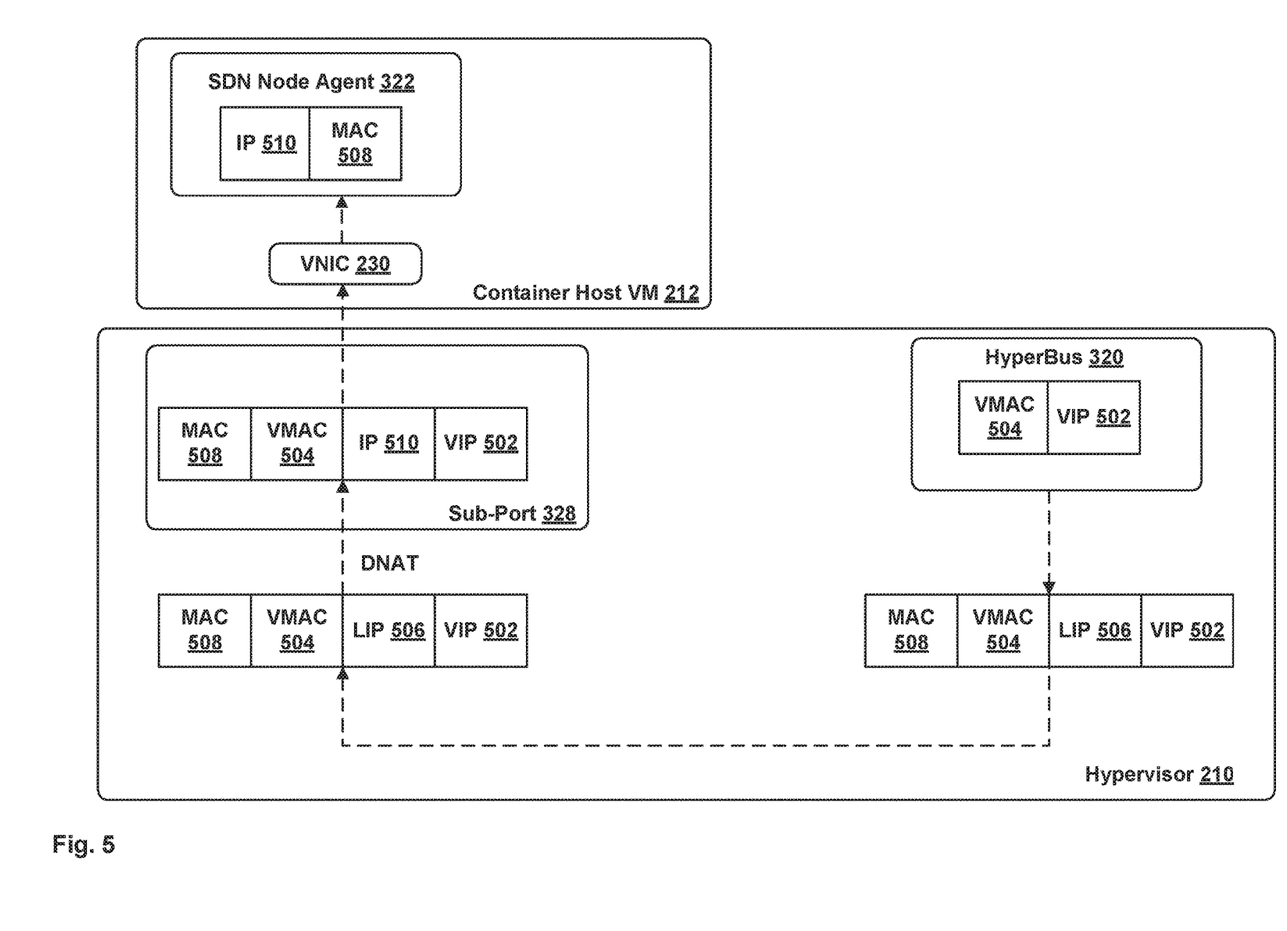
FIG. 5 illustrates destination network address translation performed by a virtual port of a virtual switch of the hypervisor of FIG. 3, according to certain embodiments described herein.

At 410, HyperBus 320 generates one or more packets having a payload that includes the information received from SDN LCP 208. For example, in embodiments where the information relates to a container's network interface configuration information, HyperBus 320 generates one or more packets to carry the network interface configuration information of the container to SDN node agent 322. For example, in such embodiments, the packets' payloads include the container's IP/MAC address, the corresponding VLAN ID, the gateway IP, and a container identifier that identifies the container (e.g., container ID, CIF ID, etc.). In addition, the packets' headers include the source IP and MAC address of HyperBus 320 (VIP 502 and VMAC 504, as shown in FIG. 5) and the destination IP and MAC address associated with SDN node agent 322 (LIP 506 and MAC 508, as shown in FIG. 5).

HyperBus 320 is able to determine SDN node agent 322's corresponding LIP based on the mapping of the LIPs to SDN node agents 322 (e.g., to the VNICs of the container host VMs of the SDN node agents 322). In some embodiments, when generating the packets, as described above, HyperBus 320 also generates and stores a VXLAN ID in the metadata associated with the packets (e.g., stored separately from the packets), which enables virtual switch 220 to determine how to forward the packets. In such embodiments, this VXLAN ID is associated with sub-port 328, that is configured for passing traffic associated with generic channel 350. The VXLAN ID is reserved by the network (e.g., SDN LCP 208) for generic channel 350's traffic.

At 415, virtual switch 220 receives the one or more packets, generated by HyperBus 320, from HyperBus 320. For example, virtual switch 220 receives the one or more packets at port 329.

At 420, virtual switch 220 determines how to forward the packets using its forwarding tables. In some embodiments, as described above, virtual switch 220 is configured with forwarding tables that map a number of tuples (e.g., VXLAN ID, destination MAC address, destination IP address etc.) to a number of ports or sub-ports. In such embodiments, virtual switch 220 examines the packets' VXLAN ID, stored in metadata associated with the packet, as well as the packets' destination IP/MAC address to identify the correct sub-port. For example, based on the packets' VXLAN ID as well as destination IP address (i.e., LIP 506) and destination MAC address (i.e., MAC 508), virtual switch 220 identifies sub-port 328 as the correct sub-port, which, as described above, is configured for communicating HyperBus 320's traffic to container host VM 212.

At 425, prior to forwarding the packets to sub-port 328, virtual switch 220 also tags the packets with an appropriate VLAN ID (i.e., different from the container's VLAN ID that is in the payload of the packets) that is configured by SDN LCP 208 for generic channel 350. Virtual switch 220 performs this tagging based on a mapping of the VXLAN ID to the VLAN ID that is maintained by the virtual switch 220. As described in further detail below, the VLAN ID enables container host VM 212 (i.e., virtual switch 240) to determine that the packets are coming through generic channel 350 and are destined for SDN node agent 322. It should be noted that though certain embodiments are described herein with respect to using VLAN as the tagging mechanism for packets, other tagging mechanisms may similarly be used including virtual Ethernet port aggregator (VEPA), virtual network tag (VN-Tag), Geneve, etc., for both packets carried by generic channel 350 as well as packets relating to container data (i.e., any packets handled by virtual switch 220).

At 430, after the packets are tagged with the VLAN ID, virtual switch 220 forwards the packets to sub-port 328. When the packets are received at sub-port 328, in some embodiments, as described further in relation to FIG. 5, sub-port 328 is configured to perform address translation (i.e., destination network address translation (DNAT)) to replace the destination IP address that was allocated by HyperBus 320 for SDN node agent 322 (e.g., LIP 506) with SDN node agent 322's IP address (e.g., fixed IP address IP 510) using the mapping of LIPs to SDN node agents 322 (e.g., to the VNICs of the container host VMs of the SDN node agents 322) and SDN node agents 322's corresponding IP addresses (e.g., fixed IP addresses).

At 435, VNIC 230 receives the one or more packets from hypervisor 210 and sends the packets to virtual switch 240 of host VM 212. For example, VNIC 230 passes the packets to virtual switch 240 through port 226.

At 440, virtual switch 240 processes the one or more packets and forwards them to SDN node agent 322. In some embodiments, a separate port 244, distinct from port 242, is configured on virtual switch 240 for passing only packets that are tagged with the VLAN ID associated with generic channel 350. For example, virtual switch 240 is configured with forwarding tables that provide mapping to a number of tuples (e.g., VLAN ID, destination IP/MAC address). According, after receiving the packets, virtual switch 240 uses its forwarding tables to determine, based on the packets' VLAN ID, destination IP/MAC address (i.e., IP 510 and MAC 508), that they need to be forwarded to SDN node agent 322 through port 244.

Where the packets' payloads include the network interface configuration information for a newly created container, the network interface configuration information may be used by net plugin 216 to set up a network interface for the new container and also configure virtual switch 240 to process and forward subsequent packets that are destined for the new container. More specifically, as described above, after the container is created, container host services 214 directs net plugin 216 to set up networking for the newly created container, at which point net plugin 216 collects the network interface configuration information from SDN node agent 322. Net plugin 216 determines that the network interface configuration information received from SDN node agent 322 belongs to the new container, based on the container identifier included in the information. Net plugin 216 then configures the new container's network interface with the container's IP/MAC address as well as the VLAN ID.

After the container is set up with a network interface, any packets received at virtual switch 220 of hypervisor 210 is forwarded (i.e., based on the headers' destination IP/MAC addresses of the container and a VXLAN ID (different from the VXLAN ID associated with generic channel 350)) to port 224, passed to VNIC 230, and from there processed by virtual switch 240 and forwarded to the new container via port 242 of virtual switch 240 (i.e., again based on the packets' destination IP/MAC addresses and the VLAN ID).

As described above, in some embodiments, payloads of packets received at SDN node agent 322 from HyperBus 320 may contain network interface configuration information for an existing container (instead of a new container), in which case net plugin 216 collects the information, which may contain an update to the existing container's network configuration, and uses it to change the container's configuration.

Figure 6:
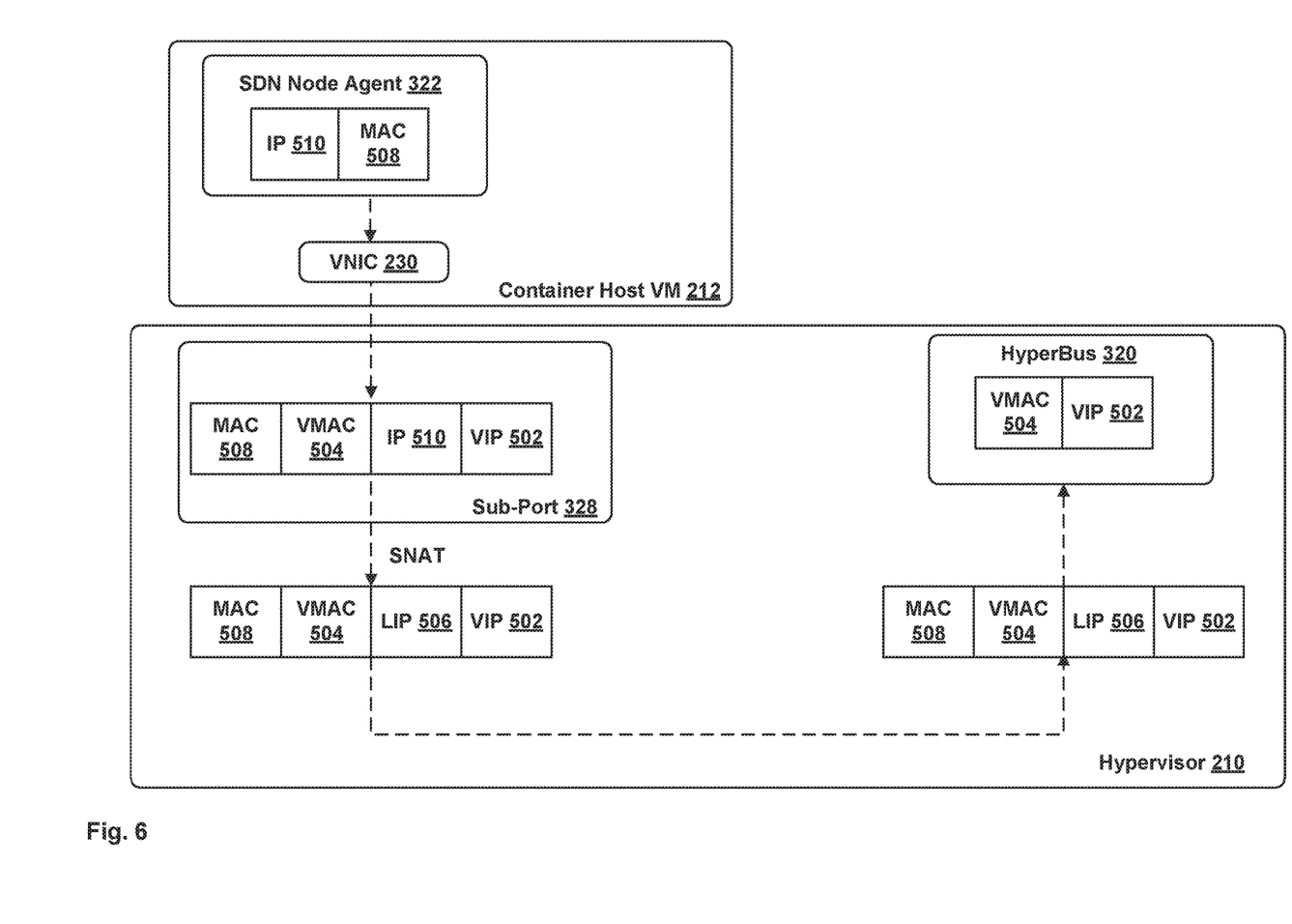
FIG. 6 illustrates source network address translation performed by a virtual port of a virtual switch of the hypervisor of FIG. 3, according to certain embodiments described herein.

The following describes the path packets generated by SDN node agent 322 take to reach HyperBus 322 with reference to FIGS. 3 and 6. Packets generated by SDN node agent 322 may contain a source IP address (IP 510) and source MAC address (MAC 508) of SDN node agent 322 as well as destination IP address (VIP 502) and destination MAC address (VMAC 504) of HyperBus 320. The packets may also be tagged with the VLAN ID associated with the VLAN that handles traffic for SDN node agent 322 inside container host VM 212. After the packets are generated by SDN node agent 322, they are communicated to virtual switch 240 through port 244. Using its forwarding tables, virtual switch 240 examines the packets' VLAN ID, destination IP/MAC address and identifies port 226 as the correct port for forwarding the traffic to. Subsequently, VNIC 230 receives the packets from port 226 and forwards them to sub-port 328. In some embodiments, sub-port 328 performs source network address translation (as further described in relation to FIG. 6) to replace the packets' source IP address 510 with the corresponding LIP using the mapping of LIPs to SDN node agents 322, as described above. Having received the traffic through sub-port 328, virtual switch 220 then examines the VLAN ID associated with the packets and maps the VLAN ID to the corresponding VXLAN ID based on a mapping of the two that is stored by virtual switch 220. Virtual switch 220 may further remove the VLAN ID tag from the packets and also store the corresponding VXLAN ID in the metadata associated with the packets. Subsequently, based on the packets' VXLAN ID as well as IP/MAC address, virtual switch 220 forwards the packets to port 329, which then communicates the packets to HyperBus 320.

As described above, in some embodiments, additional configuration steps may be taken by HyperBus 320 and SDN node agent 322 to ensure that that generic channel 350's configuration is finalized and it is ready to be used. In such embodiments, HyperBus 320 initiates a transmission control protocol (TCP) connection to SDN node agent 322 and exchanges several channel protocol messages. For example, in some embodiments, after making a TCP connection to SDN node agent 322, HyperBus 320 and SDN agent 322 exchange Version Exchange messages to ensure that both endpoints use the correct protocols. For example, HyperBus 320 sends SDN node agent 322 a message, including HyperBus 320's protocol version. In response, SDN node agent 322 sends a reply message with SDN node agent 322's own protocol version. When the version check does not pass, the connection is dropped. In addition, HyperBus 320 and SDN agent 322 exchange Session Exchange messages to open a new session between both endpoints, and create a unique client ID for container host VM 212. For example, HyperBus 320 sends SDN node agent 322 a session request. In response SDN node agent 322 sends a reply message, including a client ID generated for container host VM 212. Container host VM 212's client ID distinguishes container host VM 212 from other container host VMs. This client ID, for example, is used by SDN node agent 322 in subsequent messages to HyperBus 320.

In some embodiments, SDN node agent 322 then sends HyperBus 320 subscription message(s) to register interest updates. In some embodiments, interest updates include configuration updates relating to certain entities running inside container host VM 212. As an example, in embodiments where generic channel 350 is used for communicating containers' network interface configuration information, the subscription message is used to register all container configuration updates inside container host VM 212. The subscription message(s) carry the client ID generated by SDN node agent 322, as described above. In response to SDN node agent 322's subscription message, HyperBus 320 sends the relevant configuration for this client (e.g., container host VM 212) based on the client ID. In some embodiments, whenever any of the network configurations relating to the containers running inside container host VM 212 change, and HyperBus 320 receives new updates from SDN LCP 208 in relation to such changes, HyperBus 320 automatically sends the new configuration update to SDN node agent 322. After exchanging Version Exchange, Session Exchange, and Subscription messages, HyperBus 320 and SDN node agent 322 then exchange Keep Alive Exchange messages to monitor the health status of generic channel 350 between HyperBus 320 and SDN node agent 322. In some embodiments, if no Keep Alive message is received at each endpoint for some period of time, the connection may be closed and a new connection may be started.

In some embodiments, generic channel 350 is configured to only carry transmission control protocol (TCP) and Internet control message protocol (ICMP) network traffic types. In some other embodiments, generic channel 350 may carry other types of network traffic as well. As described above, HyperBus 320 allocates unique LIP addresses to container host VMs (or e.g., SDN node agents of the container host VMs) enabling HyperBus 320 to start different TCP connections, each with a different SDN node agent. Accordingly, when starting a connection to a SDN node agent (e.g., SDN node agent 322), HyperBus 320 uses the LIP associated with the SDN node agent. However, because in some embodiments the LIP used in each TCP connection by HyperBus 320 is different than the IP address of the SDN node agent, which is fixed, the sub-port (e.g., sub-port 328) configured to carry generic channel 350's traffic from virtual switch 220 to the corresponding container host VM's VNIC is configured to perform address translation. For example, depending on the direction of the traffic (e.g., HyperBus 320 to SDN node agent 322 or SDN node agent 322 to HyperBus 320), sub-port 328 performs address translation (e.g., translates LIP to the IP address used by SDN node agent 322 or translates the IP address used by SDN node agent 322 to the LIP).

FIG. 5 illustrates an example destination network address translation (DNAT) performed by sub-port 328 that is configured to push traffic, generated by HyperBus 320 for SDN node agent 322, to VNIC 230 of container host VM 212. As described above, packets generated by HyperBus 320 and destined for SDN 322 may contain headers including source IP and MAC addresses (VIP 502 and VMAC 504 of HyperBus 320) and destination IP and MAC addresses (LIP 506 and MAC address 508). When packets are received at port 328, DNAT is performed by port 328 to translate LIP 406 to IP 410, which is SDN node agent 322's actual IP address (e.g., fixed IP address). Sub-port 328 performs this translation because, as described above, it is configured by a mapping of the LIPs to SDN node agent 322's IP address. After performing the DNAT, port 328 passes the packet to VNIC 230.

FIG. 6 illustrates an example source network address translation (SNAT) performed by sub-port 328. For example SDN node agent 322 may transmit a packet to HyperBus 320. The packet may contain a payload as well headers including source IP and MAC addresses (IP 510 and MAC 508) and destination IP and MAC addresses (VIP 502 and VMAC 504 of HyperBus 320). When packets are received at port 328 from VNIC 320, SNAT is performed by port 328 to translate IP 510 to LIP 506. This allows HyperBus 320 to determine that the packet is arriving from SDN node agent 322 or container host VM 212.

As described above a generic channel established between hypervisor 210 and a VM running "on top of" the hypervisor may be used for exchanging any type of information between the hypervisor and the VM. Accordingly, although the implementation of generic channel 350 was described in relation to FIG. 3, which shows containers and components relating to containers, the use of generic channel 350 to communicate a new container's network interface configuration is merely an example use of a generic channel.

As discussed, traffic that is carried by generic channel 350 is separated from the network path (i.e., the path through port 226, 224, and 242, as described in relation to FIG. 2) on which container traffic is carried. Generic channel 350 also provides a certain set of security features. For example, in some embodiments, HyperBus 320 is on a TCP/IP stack (VMKNIC's TCP/IP stack, as described above) in hypervisor 210 that is different than the TCP/IP stack that handles networking for other types of traffic, including container traffic. In addition, in some embodiments, for security considerations, generic channel 350 is configured to drop packets if the rate at which container host VM 212 (e.g., SDN node agent 322) is sending messages or packets to HyperBus 320 exceeds a certain threshold or threshold value. Also, in some embodiments, as described above, generic channel 350 is configured to only carry TCP and ICMP packets. Further, in some embodiments, only HyperBus 320 is allowed to initiate connections to SDN node agent 322 and not the other way around. In such embodiments, any connections initiated by SDN node agent 322 to HyperBus 320 is dropped. For example, when a connection is initiated by SDN node agent 322 to HyperBus 320 in order to carry synchronization (SYN) packets, the connection is dropped by generic channel 350 to thwart attacks such as SNY flooding.

In some embodiments, additional security may be implemented in order to prevent a container host VM from monitoring traffic that is generated by HyperBus 320 and destined for another container host VM. In such embodiment, a port isolation technology, such as private VLAN (PVLAN) may be implemented. There are three types of PVLAN ports, which include a promiscuous port, an isolated port, and a community port. A promiscuous port is able to communicate with all interfaces, including the isolated and community ports within a PVLAN. An isolated port has complete Layer-2 network separation from other ports within the same PVLAN, but not from the promiscuous ports. For example, traffic from an isolated port is forwarded only to promiscuous ports.

Figure 7:
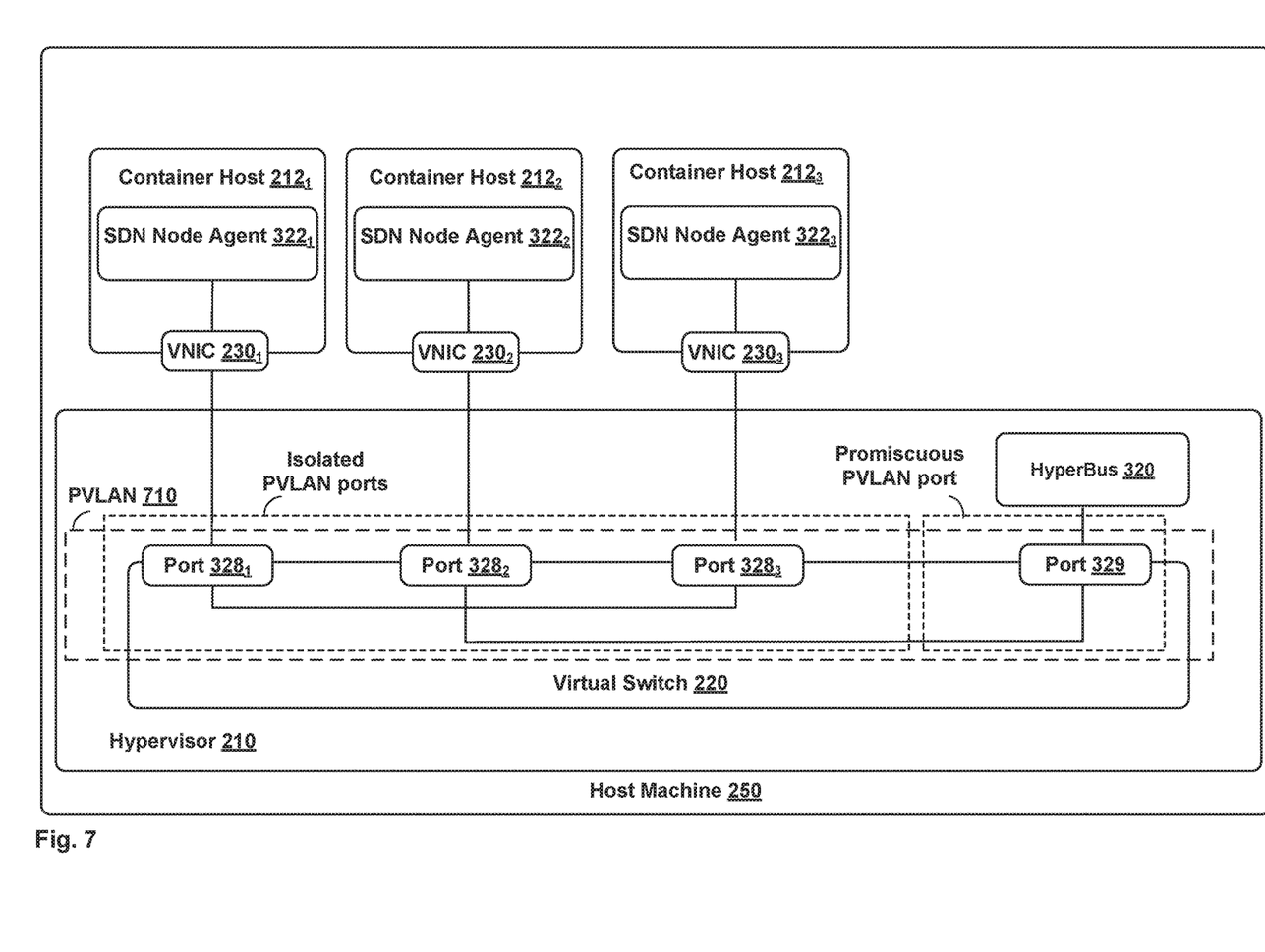
FIG. 7 illustrates an application of a port isolation technology to provide security to the generic channel of FIG. 3, according to certain embodiments described herein.

FIG. 7 illustrates an example implementation of the PVLAN technology. As shown in FIG. 7, all ports in a port-group, including ports 328 that are couple to container hosts 212 as well as port 329 that is coupled to HyperBus 320, are connected through PVLAN 710. However, ports $328_1$-$328_3$ are isolated PVLAN ports while port 329 a promiscuous PVLAN port. As a result, container host VMs $212_1$-$212_3$, coupled to isolated PVLAN ports $328_1$-$328_3$, are not able to communicate with each other but each of them is able to communicate with HyperBus 320 through promiscuous PVLAN port 329.

In sum, embodiments described herein provide a generic communication channel for information exchange between a hypervisor and a VM running "on top of" the hypervisor. As described above, the generic channel is cross-platform and can be used for exchanging any type of information. In an example use-case, as discussed above, the generic channel is used in environments where SDN is integrated with solutions such as PaaS and CaaS that allow container to be deployed in the environment and provide compute and storage support to the containers. In such an example use-case, the generic channel is used to carry network interface configuration information of a newly created container regardless of the type or variety of the container orchestrator through which the container is created and deployed.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system— computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for exchanging information between a hypervisor and a virtual machine run by the hypervisor that resides on a host machine, comprising:

receiving, at a first daemon running on the hypervisor, information from a network control plane, wherein the information is destined for a second daemon running inside the virtual machine;

generating, at the first daemon, a packet having a payload including at least a portion of the information and a header including a source internet protocol (IP) address of the first daemon, a source media access control (MAC) address of the first daemon, a first destination IP address associated with the second daemon, and a destination MAC address of the second daemon;

storing a first identifier in metadata associated with the packet;

receiving, at a first port of a first virtual switch implemented by the hypervisor, the packet from the first daemon, the first daemon being coupled to the first port;

determining, at the first virtual switch, to forward the packet to a second port of the first virtual switch based on the first identifier, the destination MAC address, and the first destination IP address, wherein the second port is configured to pass packets associated with the first identifier;

tagging, at the first virtual switch, the packet with a second identifier based on a mapping of the first identifier to the second identifier;

transmitting the packet, at the second port of the first virtual switch, to a virtual network interface card (VNIC) of the virtual machine, wherein the VNIC is coupled to the second port;

passing, at the VNIC, the packet to a second virtual switch implemented by the virtual machine;

determining, at the second virtual switch, to forward the packet to a port on the second virtual switch based on the second identifier, the destination MAC address, and a second destination IP address, wherein the port is configured to pass packets associated with the second identifier, wherein the second daemon is coupled to the port; and receiving the packet at the second daemon over the port.

2. The method of claim 1, wherein the first identifier comprises a virtual extensible local area network ID (VXLAN ID), wherein the second identifier comprises a virtual local area network ID (VLAN ID) associated with a VLAN for connecting the first daemon and the second daemon.

3. The method of claim 1, wherein the information comprises network interface configuration information of a container, the method further comprising:

collecting, at a node agent, the information from the second daemon; and configuring a network interface of the container using the information.

4. The method of claim 3, wherein after the configuring, traffic associated with the container is communicated by the first virtual switch to the VNIC of the virtual machine using a port different than the second port.

5. The method of claim 1, wherein the hypervisor runs a plurality of virtual machines including the virtual machine, each of the plurality of virtual machines running a copy of the second daemon, wherein each copy of the second daemon is configured with the second destination IP address, the second destination IP address being different than the first destination IP address; the method further comprising:

performing network address translation, at the second port of the first virtual switch, to replace the first destination IP address of the second daemon with the second destination IP address of the second daemon, prior to the transmitting.

6. The method of claim 1, wherein the hypervisor runs a plurality of virtual machines including the virtual machine, each of the plurality of virtual machines running a copy of the second daemon, wherein the plurality of virtual machines are in an isolated private local area network (PVLAN) port group, and wherein the first daemon is in a promiscuous PVLAN port group.

7. The method of claim 1, wherein the first daemon generates and allocates the first destination IP address associated with the second daemon.

8. The method of claim 1, wherein the first daemon uses a network stack in the hypervisor that is different than a network stack in the hypervisor that handles networking for traffic communicated between the virtual machine and one or more other virtual machines running on the hypervisor and traffic communicated between the virtual machine and one or more other hosts.

9. The method of claim 1, wherein the first virtual switch is configured to drop packets upon determining that a rate at which the virtual machine is sending packets to the first daemon exceeds a threshold.

10. The method of claim 1, wherein the second daemon is prevented from initiating a connection with the first daemon.

11. The method of claim 1, wherein the first destination IP address is the same as the second destination IP address.

12. A non-transitory computer readable medium comprising instructions to be executed in a computer system, wherein the instructions when executed in the computer system perform a method for exchanging information between a hypervisor and a virtual machine run by the hypervisor that resides on the computer system, the method comprising:

receiving, at a first daemon running on the hypervisor, information from a network control plane, wherein the information is destined for a second daemon running inside the virtual machine;

generating, at the first daemon, a packet having a payload including at least a portion of the information and a header including a source internet protocol (IP) address of the first daemon, a source media access control (MAC) address of the first daemon, a first destination IP address associated with the second daemon, and a destination MAC address of the second daemon;

storing a first identifier in metadata associated with the packet;

receiving, at a first port of a first virtual switch implemented by the hypervisor, the packet from the first daemon, the first daemon being coupled to the first port;

determining, at the first virtual switch, to forward the packet to a second port of the first virtual switch based on the first identifier, the destination MAC address, and the first destination IP address, wherein the second port is configured to pass packets associated with the first identifier;

tagging, at the first virtual switch, the packet with a second identifier based on a mapping of the first identifier to the second identifier;

transmitting the packet, at the second port of the first virtual switch, to a virtual network interface card (VNIC) of the virtual machine, wherein the VNIC is coupled to the second port;

passing, at the VNIC, the packet to a second virtual switch implemented by the virtual machine;

determining, at the second virtual switch, to forward the packet to a port on the second virtual switch based on the second identifier, the destination MAC address, and a second destination IP address, wherein the port is configured to pass packets associated with the second identifier, wherein the second daemon is coupled to the port; and receiving the packet at the second daemon over the port.

13. The non-transitory computer readable medium of claim 12, wherein the first identifier comprises a virtual extensible local area network ID (VXLAN ID), wherein the second identifier comprises a virtual local area network ID (VLAN ID) associated with a VLAN for connecting the first daemon and the second daemon.

14. The non-transitory computer readable medium of claim 12, wherein the information comprises network interface configuration information of a container, the method further comprising:

collecting, at a node agent, the information from the second daemon; and configuring a network interface of the container using the information, wherein after the configuring, traffic associated with the container is communicated by the first virtual switch to the VNIC of the virtual machine using a port different than the second port.

15. The non-transitory computer readable medium of claim 12, wherein the hypervisor runs a plurality of virtual machines including the virtual machine, each of the plurality of virtual machines running a copy of the second daemon, wherein each copy of the second daemon is configured with the second destination IP address, the second destination IP address being different than the first destination IP address; the method further comprising:
performing network address translation, at the second port of the first virtual switch, to replace the first destination IP address of the second daemon with the second destination IP address of the second daemon, prior to the transmitting.

16. The non-transitory computer readable medium of claim 12, wherein the first daemon generates and allocates the first destination IP address associated with the second daemon.

17. A computer system, wherein system software for the computer system is programmed to execute a method for exchanging information between a hypervisor and a virtual machine run by the hypervisor that resides on the computer system, the method comprising:
receiving, at a first daemon running on the hypervisor, information from a network control plane, wherein the information is destined for a second daemon running inside the virtual machine;
generating, at the first daemon, a packet having a payload including at least a portion of the information and a header including a source internet protocol (IP) address of the first daemon, a source media access control (MAC) address of the first daemon, a first destination IP address associated with the second daemon, and a destination MAC address of the second daemon;
storing a first identifier in metadata associated with the packet;
receiving, at a first port of a first virtual switch implemented by the hypervisor, the packet from the first daemon, the first daemon being coupled to the first port;
determining, at the first virtual switch, to forward the packet to a second port of the first virtual switch based on the first identifier, the destination MAC address, and the first destination IP address, wherein the second port is configured to pass packets associated with the first identifier;
tagging, at the first virtual switch, the packet with a second identifier based on a mapping of the first identifier to the second identifier;
transmitting the packet, at the second port of the first virtual switch, to a virtual network interface card (VNIC) of the virtual machine, wherein the VNIC is coupled to the second port;
passing, at the VNIC, the packet to a second virtual switch implemented by the virtual machine;
determining, at the second virtual switch, to forward the packet to a port on the second virtual switch based on the second identifier, the destination MAC address, and a second destination IP address, wherein the port is configured to pass packets associated with the second identifier, wherein the second daemon is coupled to the port; and
receiving the packet at the second daemon over the port.

18. The computer system of claim 17, wherein the first identifier comprises a virtual extensible local area network ID (VXLAN ID), wherein the second identifier comprises a virtual local area network ID (VLAN ID) associated with a VLAN for connecting the first daemon and the second daemon.

19. The computer system of claim 17, wherein the information comprises network interface configuration information of a container, the method further comprising:
collecting, at a node agent, the information from the second daemon; and
configuring a network interface of the container using the information, wherein after the configuring, traffic associated with the container is communicated by the first virtual switch to the VNIC of the virtual machine using a port different than the second port.

20. The computer system of claim 17, wherein the hypervisor runs a plurality of virtual machines including the virtual machine, each of the plurality of virtual machines running a copy of the second daemon, wherein each copy of the second daemon is configured with the second destination IP address, the second destination IP address being different than the first destination IP address; the method further comprising:
performing network address translation, at the second port of the first virtual switch, to replace the first destination IP address of the second daemon with the second destination IP address of the second daemon, prior to the transmitting.

21. The computer system of claim 17, wherein the first daemon generates and allocates the first destination IP address associated with the second daemon.

* * * * *